United States Patent
Eom et al.

(10) Patent No.: US 6,873,594 B2
(45) Date of Patent: Mar. 29, 2005

(54) METHOD OF MODIFYING IDENTIFICATION DATA IN LINKING LOSS AREA

(75) Inventors: Woo-sik Eom, Gyeonggi-do (KR); Kyung-geun Lee, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 501 days.

(21) Appl. No.: 09/976,034

(22) Filed: Oct. 15, 2001

(65) Prior Publication Data

US 2002/0064119 A1 May 30, 2002

(30) Foreign Application Priority Data

Nov. 27, 2000 (KR) .......................................... 2000-71030

(51) Int. Cl.[7] ............................. G11B 20/18; G11B 7/07
(52) U.S. Cl. ................................... 369/275.1; 369/59.1
(58) Field of Search .............................. 369/59.1, 275.1

(56) References Cited

U.S. PATENT DOCUMENTS

| | | | | |
|---|---|---|---|---|
| 4,089,027 A | * | 5/1978 | Grigoletti | 360/72.2 |
| 6,115,340 A | * | 9/2000 | Van Den Enden et al. | 369/47.28 |
| 6,442,128 B1 | * | 8/2002 | Lee et al. | 369/275.1 |
| 6,512,724 B1 | * | 1/2003 | Oishi | 369/53.35 |
| 6,724,705 B1 | * | 4/2004 | Ko et al. | 369/53.21 |
| 6,728,879 B1 | * | 4/2004 | Atkinson | 713/168 |

FOREIGN PATENT DOCUMENTS

EP           1052639 A2 * 11/2000   ........... G11B/20/18

* cited by examiner

*Primary Examiner*—Gautam R. Patel
(74) *Attorney, Agent, or Firm*—Staas & Halsey, LLP

(57) ABSTRACT

A method of overwriting data in a linking loss area. The method includes the operations of (a) determining whether or not the first sector of a block in which it is desired for data to be recorded is a linking loss area, and if it is determined that the first sector is a linking loss area, reading the previous block; (b) modifying data type identification information of the last sector of the previous block after completing reading the previous block; and (c) recording data in blocks starting from the previous block. According to this method, based on determination of whether or not the first sector of the block in which it is desirable to record data is a linking loss area, data is recorded in the blocks starting from the current block or from the previous block so as to prevent errors in reproducing. By doing so, the method improves error correction effects.

13 Claims, 4 Drawing Sheets

METHOD OF MODIFYING IDENTIFICATION DATA IN LINKING LOSS AREA

CROSS-REFERENCE TO RELATED APPLICATIONS

This application claims the benefit of Korean Patent Application No. 2000-71030 filed on Nov. 27, 2000, in the Korean Industrial Property Office, the disclosure of which is incorporated herein by reference.

BACKGROUND OF THE INVENTION

1. Field of the Invention

The present invention relates to a method of recording and/or reproducing optical data, and more particularly, to a method of overwriting data in a linking loss area.

2. Description of the Related Art

Since basic recording units of a digital versatile disc-rewritable (DVD-RW) are positioned one after another in a continuous series, in contrast to those of a DVD-Random Access Memory (DVD-RAM) which are divided by physical identifier (PID) areas or buffer fields (extra areas allocated to correspond to a requirement for controlling a spindle motor accurately), it is required that a recording-start point of each basic recording unit in a DVD-RW be precisely located. Here, the basic recording unit of the DVD-RAM may be a sector and the basic recording unit of the DVD-RW may be an error correction code (ECC) block.

Since the basic recording units of the DVD-R and the DVD-RW, which have the same physical formats, are positioned in a continuous series as described above, when data transmission or recording is momentarily discontinued or subsequently recommences, the DVD-R and the DVD-RW use a linking scheme in which an extra area of a next recording-start point is allocated. The sizes of a linking area which is applied to the linking scheme are 0 kilo bytes (KB), 2 KB, and 32 KB.

FIGS. 1A through 1C are schematic diagrams showing conventional data linking methods. FIG. 1A shows the data structure of a 2 KB linking method, FIG. 1B shows the data structure of a 32 KB linking method, and FIG. 1C shows the data structure of a 0 KB linking method. In the conventional linking methods, if the data type in sector information is '1b', it indicates that the next sector is a linking loss area. The linking loss area has no effective data and only stores dummy data, that is, '00h'. Therefore, main data recorded in the linking loss area can be replaced with '00h' regardless of reproducing data and therefore correction of an ECC block can be improved.

FIG. 1A shows a data structure in which the size of a linking loss area is 2 KB, and FIG. 1B shows a data structure in which the size of a linking loss area is 32 KB. If user data does not fill an entire ECC block 1, padding data is recorded in the remaining part of ECC block 1. If the data type of the last sector of ECC block 1 is '1b', the first sector (2 KB) of an ECC block 2 or the entire ECC block 2 (16 sectors=32 KB) becomes a linking loss area according to a linking type, and padding data is recorded in the linking loss area.

FIG. 1C shows a data structure in which 0 KB linking is performed after performing 2 KB linking or 32 KB linking. That is, FIG. 1C shows 0 KB link recording in an ECC block 2 (the 32 KB linking loss area) of FIG. 1A or 1B, and user data is recorded from the first sector of the ECC block 2 in which 0 KB linking is performed. However, if the data type is '1b' in the last recording sector of ECC block 1 of FIG. 1C, the next sector, that is, the first sector of ECC block 2, may be taken for a linking loss area and user data can be replaced with '00h'. Therefore, an error may occur in this sector, and as a result an ECC error occurs in the entire ECC block 2, and accordingly, data in the ECC block 2 cannot be reproduced.

SUMMARY OF THE INVENTION

Accordingly, it is an object of the present invention to provide a method of overwriting data in a linking loss area in which data is recorded in blocks starting from a current block or from a previous block according to whether or not a first sector of a block in which data is desired to be recorded is a linking loss area.

Additional objects and advantages of the invention will be set forth in part in the description which follows and, in part, will be obvious from the description, or may be learned by practice of the invention.

The foregoing and other objects of the present invention are achieved by providing a method of overwriting data in a linking loss area when predetermined data is recorded on a recording medium in which a predetermined size of an error correction code (ECC) block is divided into a plurality of sectors, the method comprising determining whether or not the first sector of a block in which it is desired for data to be recorded is a linking loss area, and if it is determined that the first sector is a linking loss area, reading the previous block; modifying data type identification information of the last sector of the previous block after completing reading the previous block; and recording data in blocks starting from the previous block.

It is preferable that in determining whether or not the first sector of a block in which it is desired for data to be recorded is a linking loss area, if it is determined that the first sector of the block in which data is desired to be recorded is not a linking loss area, data is recorded in blocks starting from the current block.

BRIEF DESCRIPTION OF THE DRAWINGS

These and other objects and advantages of the present invention will become more apparent and more readily appreciated from the following description of the embodiments, taken in conjunction with the accompany drawings of which.

DESCRIPTION OF THE PREFERRED EMBODIMENTS

Figure 1A:
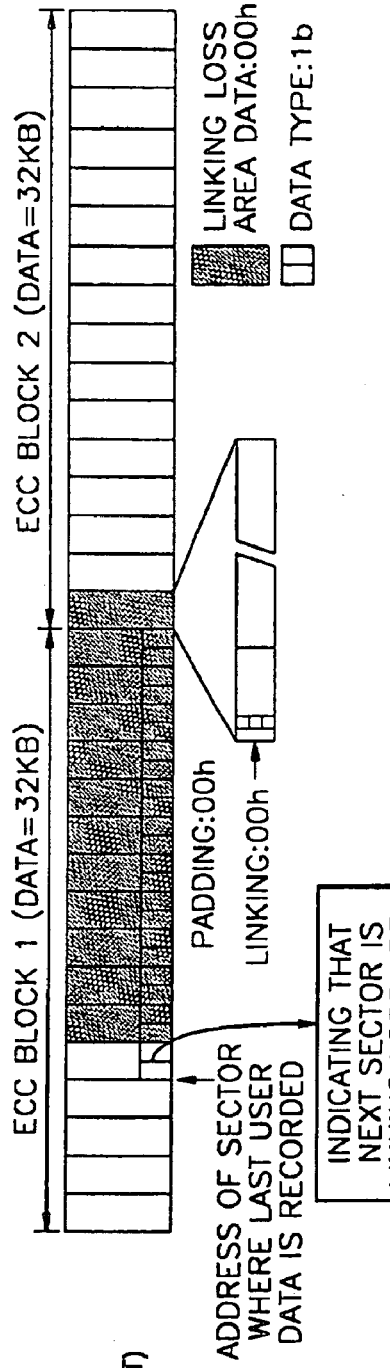
FIGS. 1A, 1B, and 1C are schematic diagrams of the data structure in a conventional data linking method.
Figure 1B:
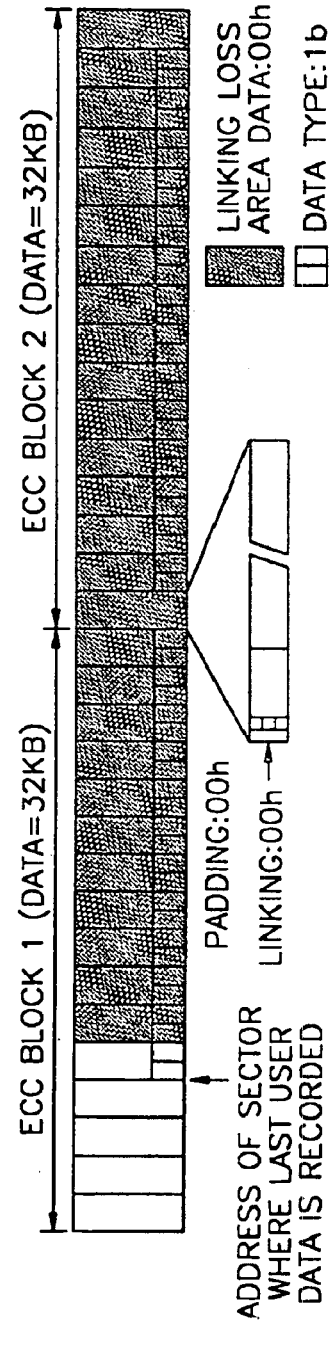

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 2:
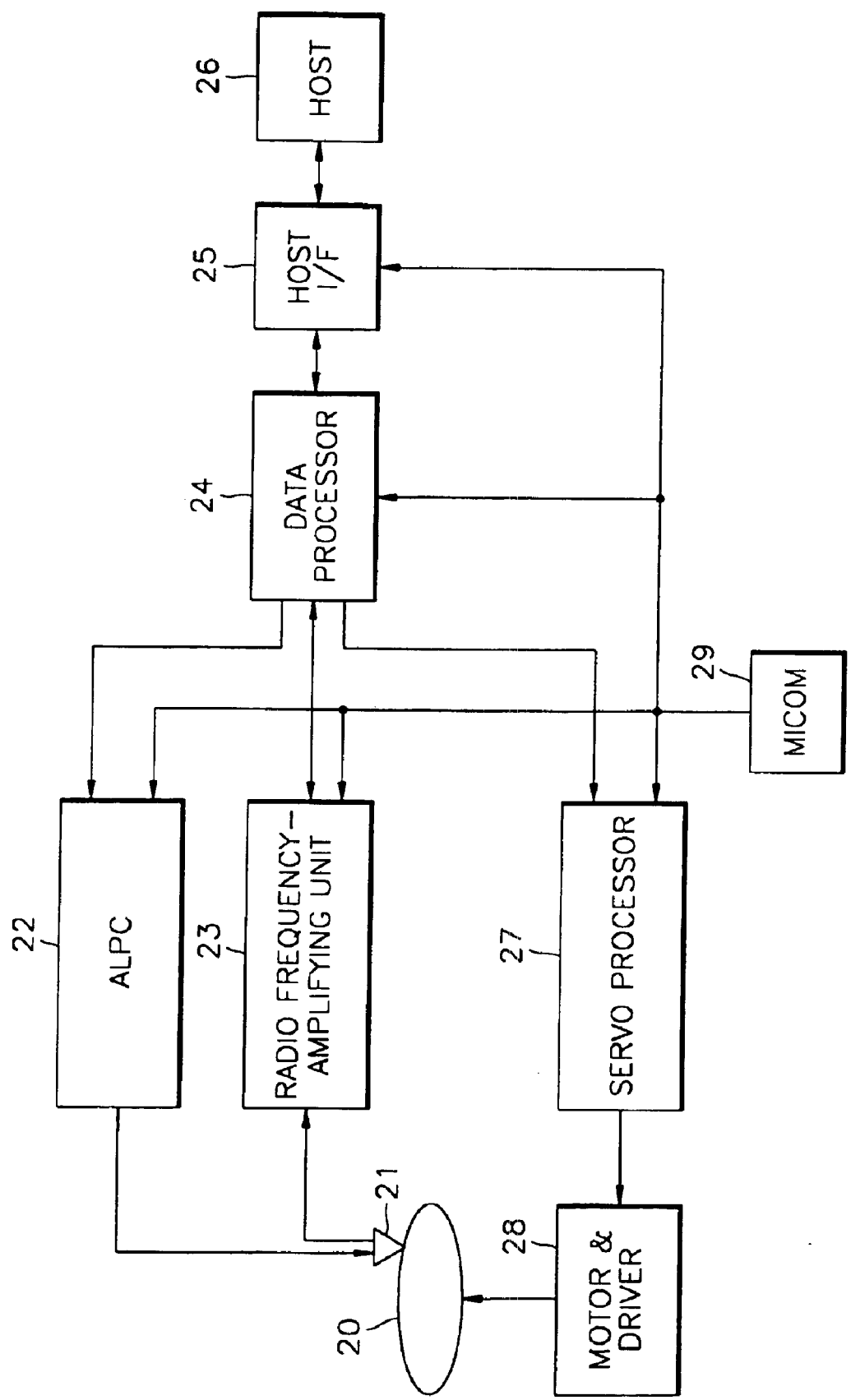
FIG. 2 is a block diagram of an ordinary digital versatile disc-recording and/or reproducing (DVD-R/RW) apparatus.

The ordinary DVD-R/RW apparatus shown in FIG. 2 has a disc 20, a pickup 21, an auto laser power control (ALPC) 22, a radio frequency-amplifying unit 23, a data processor 24, a host interface 25, a host 26, a servo processor 27, a motor and driver 28, and a microcomputer (MICOM) 29.

The ALPC 22 controls the power of a laser beam emitted from the pickup 21, and the radio frequency-amplifying unit 23 amplifies a minute signal picked up from the disc 20. The data processor 24 processes link data in accordance with data types, performs detection, insertion, protection, modulation and demodulation of a synchronization signal, and generates various control signals for error correction and for controlling the radio frequency-amplifying unit 23. The host interface 25 connects the optical recording apparatus with a host 26. The servo processor 27 controls various motors and servos related to the disc 20 to perform tracking and focusing, etc. The motor and driver 28 performs a function of rotating the disc 20 and driving motors, and the MICOM 29 controls the overall operation of the optical recording apparatus.

Figure 3:
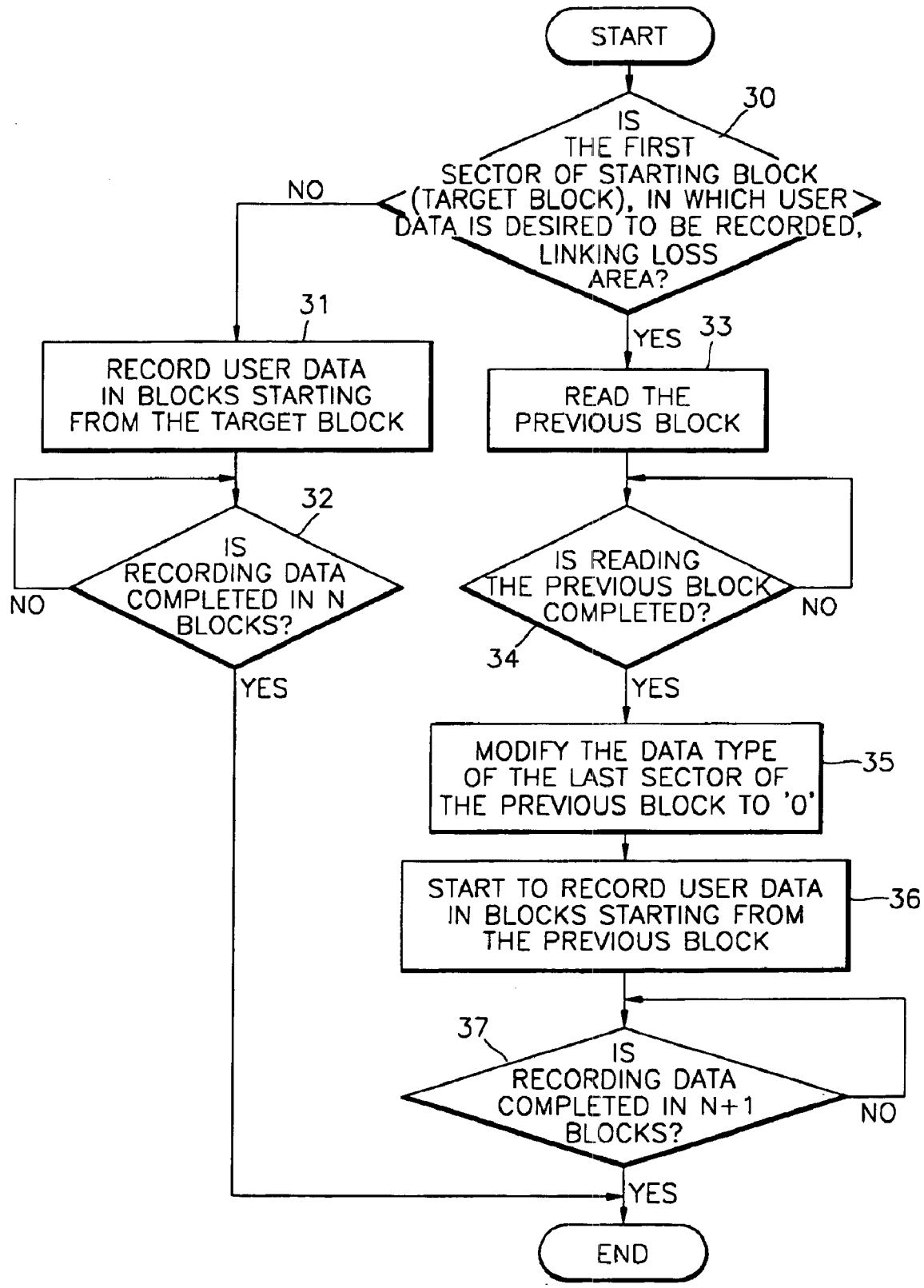
FIG. 3 is a flow chart showing the method of overwriting data in a linking loss area according to the present invention.

FIG. 3 is a flow chart showing the method of overwriting data in a linking loss area according to the present invention. The method has the operations of determining whether or not the first sector of a starting block (a target block), in which user data is desired to be recorded, is a linking loss area (operation 30), recording user data in blocks starting from the target block (operation 31), determining whether or not recording data is completed in N blocks (operation 32), reading the previous block (operation 33), determining whether or not reading the previous block is completed (operation 34), modifying the data type of the last sector of the previous block to '0' (operation 35), starting to record user data in blocks starting from the previous block (operation 36), and determining whether or not recording data is completed in N+1 blocks (operation 37). The host 26 generates commands for all operations. It is assumed in the present invention that user data is recorded in N ECC blocks.

The sequence of these operations will now be described as follows. To record user data on the disc 20, the host 26 determines whether or not the first sector of a starting block (a target block), in which user data is desired to be recorded, is a linking loss area in operation 30.

Figure 5:
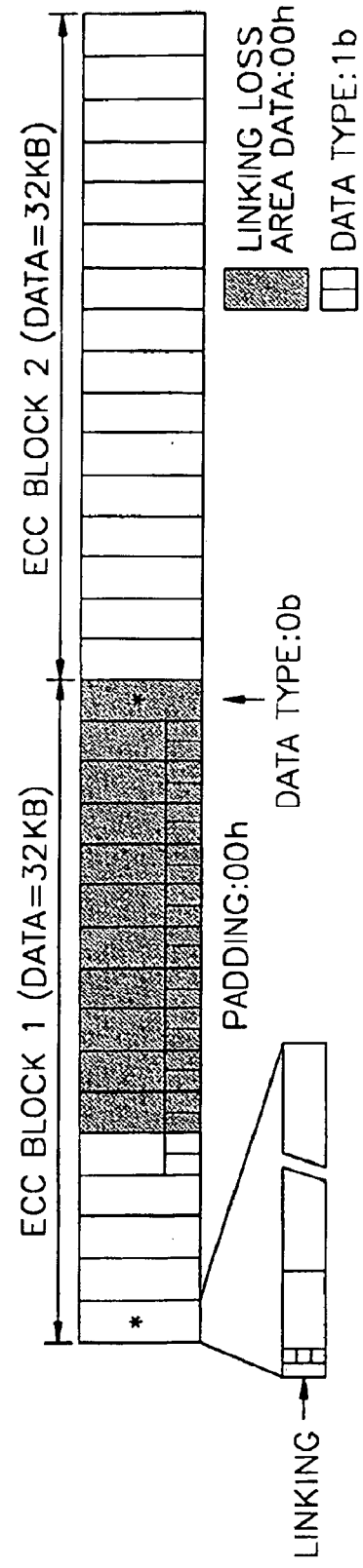
FIG. 5 is a schematic diagram explaining the effect of the method of FIG. 3.

If it is assumed that the target block is ECC block 2 of FIG. 5, the host 26, having information on a linking loss area, performs the determination of whether or not the first sector of ECC block 2 is a linking loss area.

If the first sector of a starting block (the target block), in which user data is desired to be recorded, is not a linking loss area, user data is recorded in blocks starting from the target block, as provided in operation 31.

Recording is stopped when user data is recorded in N ECC blocks, as illustrated in operation 32.

If the first sector of a starting block (the target block), in which user data is desired to be recorded, is a linking loss area, the previous block is read, as illustrated in operation 33. If the last sector of ECC block 1 is set to '1', the first sector of the following ECC block 2 is regarded as a linking loss area when data is reproduced, and therefore ECC errors increase. To solve this problem, first, the ECC block 1 is read.

If reading the previous block, that is, the ECC block 1, is completed (operation 34), the data type of the last sector of the ECC block 1 is modified from '1b' to '0b', as illustrated in operations 34 and 35. When data is reproduced, the recording and/or reproducing apparatus determines whether or not the next sector, that is, the first sector of ECC block 2, is a linking loss area, according to the data type bit information of the last sector of ECC block 1. If the data type of the last sector of ECC block 1 is modified from '1b' to '0b', the recording and/or reproducing apparatus does not regard the first sector of the ECC block 2 as a linking loss area when data is reproduced.

Therefore, the data type of the last sector of ECC block 1 is modified to '0b' and data read from ECC block 1 is recorded in ECC block 1 in operation 36. User data is continuously recorded in the ECC blocks 1 and 2 without linking. Then, when data is reproduced, linking data in the first sector of the ECC block 2 is regarded as re-recordable data to prevent errors.

If recording data is completed in N+1 blocks, recording is finished, as illustrated in operation 37. If the first sector of a target block is a linking loss area, data is recorded in blocks starting from the previous block, and therefore data is recorded in N+1 blocks.

Figure 4:
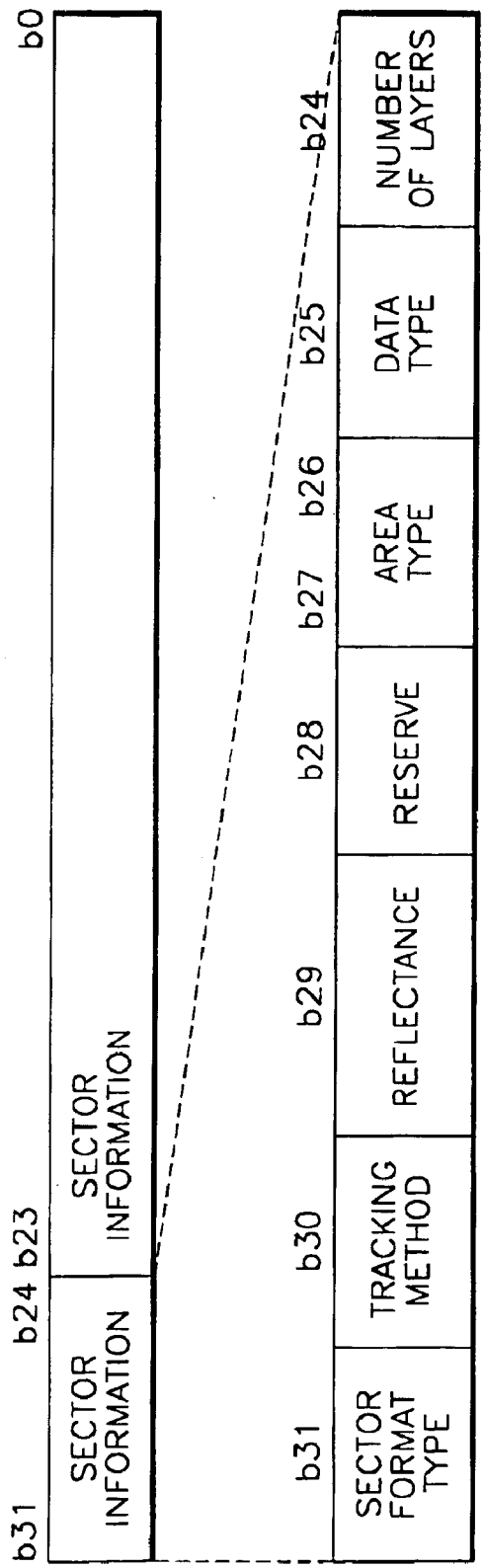
FIG. 4 is a schematic diagram showing the data structure of a data identification (ID) area in which data type information is stored.

To help understanding the present invention, FIG. 4 shows the structure of a data identification area including a data type field. The data type field is used in decoding in the recording and/or reproducing apparatus.

The data identification area shown in FIG. 4 is formed with a sector information field and a sector number field. The sector information field is formed by a sector format type field, a tracking method field, a reflectance field, a reserve field, an area type field, a data type field and a number-of-layers field.

That is, sector format type information of bit position b31 indicates a constant linear velocity (CLV) or zone constant linear velocity (ZCLV) as follows:

0b: CLV format type

1b: Zoned format type, specified for Rewritable discs

Tracking method information of bit position b30 indicates pit tracking or groove tracking as follows:

0b: Pit tracking

1b: Groove tracking, specified for Rewritable discs

Reflectance information of bit position b29 indicates whether or not reflectance exceeds 40% as follows:

0b: Reflectance is greater than 40%

1b: Reflectance is less than or equal to 40%.

Bit position b28 indicates a reserve bit.

Area type information of bit positions b27 and b26 indicates a data area, a lead-in area, a lead-out area, or a middle area for a read-only disc as follows:

00b: Data area

01b: Lead-in area

10b: Lead-out area

11b: Middle area of read-only discs

Data type information of bit position b25 indicates read-only data, or the linking data as follows:

0b: Read-only data

1b: Linking data

Layer number information of bit position b24 indicates the number of layers in a single layer disc or a dual layer disc as follows:

0b: Layer 0 of dual layer disc or single layer disc

1b: Layer 1 of dual layer disc

Figure 1C:
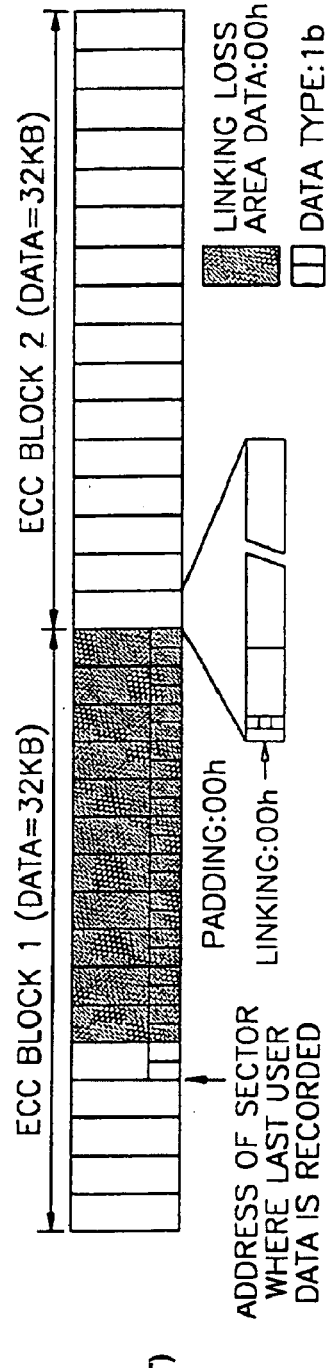

In the conventional method of FIG. 1C, if the data type of the last recording sector of ECC block 1 is '1b', the next sector, that is, ECC block 2, is taken for a linking loss area and an error occurs. However, in the method according to the present invention of FIG. 5, if the first sector of ECC block 2 (a target block), in which data is desired to be recorded, is a linking loss area, data in ECC block 1 (the previous block) is read and the data type of the last sector of ECC block 1 is modified to '0b' and then data is recorded. By doing so, the problem of taking the first sector of the ECC block 2 as a linking loss area in the conventional method can be solved.

As described above, according to the present invention, data is recorded in blocks starting from the current block or from the previous block according to the determination of whether or not the first sector of a current block is a linking loss area. By doing so, error occurrence can be prevented when data is reproduced and block error correction can be carried out more effectively.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method of overwriting data in a linking loss area when predetermined data is recorded on a recording medium wherein a predetermined size of an error correction code (ECC) block is divided into a plurality of sectors, the method comprising:

determining whether a first sector of a current block in which data is to be recorded is a linking loss area, and reading a previous block in response to determining that the first sector is a linking loss area;

modifying data type identification information of a last sector of the previous block after completing the reading of the previous block; and recording the data in blocks starting from the previous block.

2. The method of claim 1, further comprising recording the data in blocks starting from the current block in response to determining that the first sector of the block is the linking loss area.

3. The method according to claim 2, wherein recording is stopped when the data is recorded in N ECC blocks.

4. The method according to claim 1, wherein the modifying comprises modifying the last sector of the previous block from '1b' to '0b.'

5. The method according to claim 1, wherein said data type identification information is located in a data type information area formed with a sector information field and a sector number field.

6. The method according to claim 5, wherein said sector information field is formed by a sector format type field, a tracking method field, a reflectance field, a reserve field, an area field, a data type field and a number-of-layers field.

7. The method according to claim 6, wherein the sector format type information of one bit position indicates a constant linear velocity (CLV) or zone constant linear velocity (ZCLV) as follows:

a first type of bit indicates a CLV format type; and a second type of bit indicates a ZCLV format type, specified for Rewritable discs.

8. The method according to claim 6, wherein the tracking method information of one bit position indicates pit tracking or groove tracking as follows:

a first type of bit indicates Pit tracking; and a second type of bit indicates Groove tracking, specified for Rewritable discs.

9. The method according to claim 6, wherein the reflectance information of one bit position indicates whether reflectance exceeds 40% as follows:

a first type of bit indicates that Reflectance is greater than 40%; and a second type of bit indicates that Reflectance is less than or equal to 40%.

10. The method according to claim 6, wherein the area type information of at least one bit position indicates a data area, a lead-in area, a lead-out area, or a middle area for a read-only disc as follows:

00b indicates a Data area;

01b indicates a Lead-in area;

10b indicates a Lead-out area; and 11b indicates a Middle area of read-only discs.

11. The method according to claim 6, wherein the data type information of one bit position indicates read-only data, or the linking data as follows:

a first type of bit indicates Read-only data; and a second type of bit indicates Linking data.

12. The method according to claim 6, wherein the layer number information of one bit position indicates the number of layers in a single layer disc or a dual layer disc as follows:

a first type of bit indicates Layer 0 of dual layer disc or single layer disc; and a second type of bit indicates Layer 1 of dual layer disc.

13. A method of overwriting data in a linking loss area when predetermined data is recorded on a recording medium wherein a predetermined size of an error correction code (ECC) block is divided into a plurality of sectors, the method comprising:

determining whether the first sector of a current block to be recorded is a linking loss area;

recording data in blocks starting from the current block when the first sector to be recorded is determined to not be in the linking loss area; and modifying the data in a previous block when the first sector of the current block to be recorded is determined to be in the linking loss area, wherein the modified data in the previous block changes the first sector of the current block to be out of the linking loss area.

* * * * *